United States Patent [19]

Huber et al.

[11] 4,368,701
[45] Jan. 18, 1983

[54] INTERNAL COMBUSTION ENGINE WITH MEANS FOR SEPARABLY COUPLING DISCRETE CRANKSHAFTS TO EACH OTHER

[75] Inventors: Lothar Huber, Bühl-Altschweier; Oswald Friedmann, Lichtenau, both of Fed. Rep. of Germany

[73] Assignee: Luk Lamellen und Kupplungsbua GmbH, Bühl, Fed. Rep. of Germany

[21] Appl. No.: 233,958

[22] Filed: Feb. 12, 1981

[30] Foreign Application Priority Data

Feb. 13, 1980 [DE] Fed. Rep. of Germany ....... 3005344

[51] Int. Cl.³ ............................................. F02B 75/18
[52] U.S. Cl. ................................ 123/198 F; 123/52 A
[58] Field of Search .......................... 123/52 A, 198 F

[56] References Cited

U.S. PATENT DOCUMENTS 4,069,803 1/1978 Cataldo ........................... 123/198 F

FOREIGN PATENT DOCUMENTS 2828298 1/1980 Fed. Rep. of Germany ... 123/198 F

*Primary Examiner*—Tony M. Argenbright
*Attorney, Agent, or Firm*—Kontler, Grimes & Battersby

[57] ABSTRACT

An internal combustion engine wherein each of several groups of cylinders rotates a discrete crankshaft which, in turn, rotates a discrete camshaft. When the engine is operated at partial load, a single group of cylinders is in use to rotate a first crankshaft. Prior to starting a second group of cylinders, the corresponding second crankshaft, which is coaxial with the first crankshaft, must be accelerated to the angular velocity of the first crankshaft and the second crankshaft must assume a predetermined angular position with reference to the first crankshaft to thereby ensure a proper sequence of firing of the cylinders. This is accomplished by installing a positive-engagement clutch between the first and second crankshafts and a friction clutch between the corresponding camshaft. The friction clutch accelerates the second crankshaft through the medium of the corresponding camshaft and the clutch between the two crankshafts is engaged when the angular velocity of the second camshaft matches the angular velocity of the first camshaft as well as when the angular position of the second camshaft relative to the first camshaft is indicative of proper angular positions of the two crankshafts with respect to each other. The accelerating clutch is disengaged in response to or simultaneously with engagement of the clutch between the two crankshafts.

29 Claims, 1 Drawing Figure

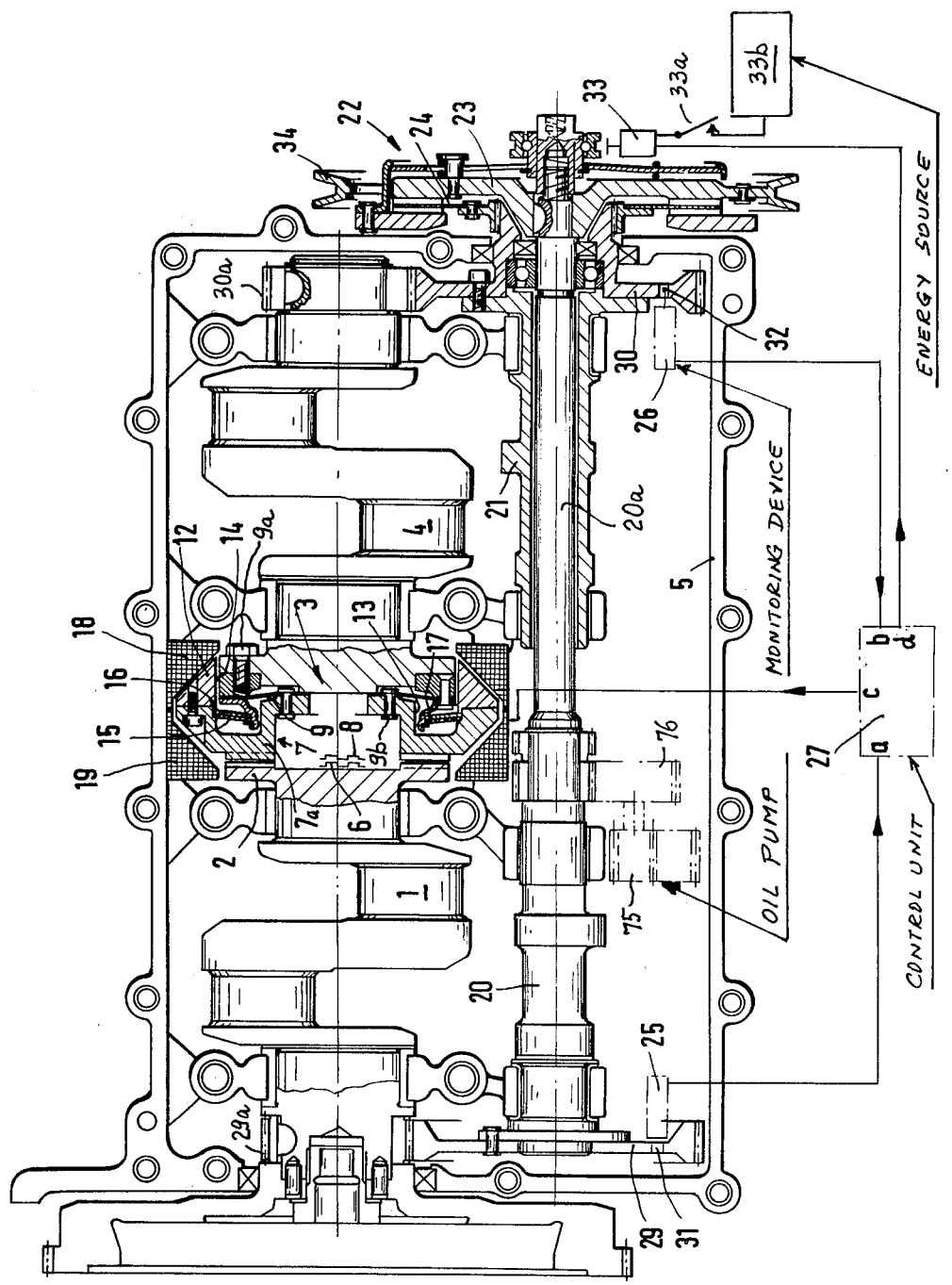

INTERNAL COMBUSTION ENGINE WITH MEANS FOR SEPARABLY COUPLING DISCRETE CRANKSHAFTS TO EACH OTHER

CROSS-REFERENCE TO RELATED CASE

Apparatus which serve purposes that are similar to the objects of the present invention are disclosed in commonly owned copending application Ser. No. 233,960 filed Feb. 12, 1981 by Maucher et al. for "Internal combustion engine with separable crankshafts", Ser. No. 233,952 filed Feb. 12, 1981 by Huber et al. for "Apparatus for establishing and terminating connections between crankshafts" and Ser. No. 233,959 filed Feb. 12, 1981 by Maucher et al. for "Apparatus for engaging and disengaging discrete crankshafts in internal combustion engines".

BACKGROUND OF THE INVENTION

The present invention relates to internal combustion engines in general, and more particularly to improvements in internal combustion engines of the type wherein several discrete groups of cylinders can rotate several discrete crankshafts. More particularly, the invention relates to improvements in internal combustion engines of the type wherein a first section or unit has a first group of cylinders to rotate a first crankshaft and at least one second or additional section or unit has a second group of cylinders to rotate one or more discrete additional crankshafts which can be coupled to or disconnected from the first crankshaft.

German Offenlegungsschrift No. 28 28 298 discloses an internal combustion engine with several discrete crankshafts which can be coupled to or disconnected from each other. One of the crankshafts rotates when the engine is operated at less than maximum load and one or more additional crankshafts are coupled to the one crankshaft preparatory to starting the operation of the additional cylinders. The cylinders are disposed in a common cylinder block. When the need arises, one or more crankshafts are disconnected from the remaining crankshaft or crankshafts by disengaging the respective clutches. This entails deactivation of the cylinders which cooperate with the disconnected crankshaft or crankshafts.

OBJECTS AND SUMMARY OF THE INVENTION

An object of the invention is to provide a novel and improved internal combustion engine with several crankshafts wherein the crankshafts can be coupled to or disconnected from each other in a novel and improved way.

Another object of the invention is to provide a novel and improved combination of elements (hereinafter called apparatus) which can be used in an engine of the above outlined character to ensure predictable coupling of discrete crankshafts to or disconnection of such crankshafts from each other under most satisfactory circumstances as regards the sequence of firing the cylinders and/or the angular velocities and/or the angular positions of the crankshafts relative to each other.

A further object of the invention is to provide a relatively simple and compact apparatus which can be accommodated in the casing and/or in or on the cylinder block of an engine exhibiting the aforediscussed features.

An additional object of the invention is to provide the apparatus with novel and improved clutches which can transmit rotary motion between various discrete crankshafts of an internal combustion engine with several discrete units or sections each of which has one or more cylinders and a discrete crankshaft.

Another object of the invention is to provide the apparatus with novel and improved accelerating means for that crankshaft or those crankshafts which are associated with idle cylinders prior to putting such cylinders to actual use.

An additional object of the invention is to provide the apparatus with novel and improved means for ascertaining and evaluating the angular velocities of various crankshafts in an engine of the above outlined character.

An ancillary object of the invention is to provide the engine with novel and improved means for preventing positive or substantially positive engagement between discrete crankshafts except when such parts are held in predetermined angular positions relative to each other.

The invention is embodied in an internal combustion engine which comprises a first section having a first crankshaft, a first camshaft and means (e.g., a gear train with a ratio of two-to-one) for transmitting torque between the first crankshaft and the first camshaft, a second section having a second crankshaft which is coaxial with the first crankshaft, a second camshaft which is coaxial with the first camshaft and means (e.g., a gear train with a ratio of two-to-one) for transmitting torque between the second crankshaft and the second camshaft (the first and second crankshafts have end portions which are adjacent to each other), a first clutch including first and second clutch members which are respectively non-rotatably connected with the end portions of the first and second crankshafts and at least one of which is movable axially of the crankshafts to and from a predetermined end position in which suitably configurated complementary profiles (e.g., alternating teeth and tooth spaces) of the two clutch members are free to positively engage each other to thus establish a direct torque-transmitting connection between the two crankshafts, shifting means (e.g., an electromagnet) which is operable to move the one clutch member axially of the crankshafts to the predetermined end position, an accelerating clutch including coaxial first and second clutch elements which are respectively non-rotatably secured to the first and second camshafts, means (e.g., a fluid-operated device) for effecting engagement between the clutch elements to thereby accelerate the second camshaft to the angular velocity of the first camshaft, and means for operating the shifting means so as to move the one clutch member to its end position on completion of acceleration of the second camshaft to the angular velocity of the first camshaft, i.e., when the RPM of the second crankshaft matches or closely approximates the RPM of the first crankshaft.

The engine preferably further comprises means for moving the one clutch member to a second end position in which the two clutch members are free to rotate relative to each other when the operator of the vehicle so desires. For example, the just mentioned means for moving the one clutch member to the second end position may comprise an electromagnet which is energizable by the operator to disengage the first clutch when the operator wishes that the cylinders which normally rotate the second crankshaft be disconnected from the source of fuel, e.g., in order to operate the engine at partial load.

The aforementioned operating means may include a control unit (preferably including or constituting an evaluating circuit having an output for transmission of signals to the electromagnet which constitutes the shifting means) which is constructed, assembled and operated in such a way that the shifting means receives a signal to move the one clutch member into positive engagement with the other clutch member only when the second camshaft assumes a predetermined angular position with reference to the first camshaft, i.e., when the second crankshaft assumes a predetermined angular position with reference to the first crankshaft.

Still further, in addition to or instead of an electromagnet, the aforementioned means for moving the one clutch member to the second end position may comprise a two-position spring which yieldably biases the one clutch member to either end position, i.e., which yieldably opposes the movement of the one clutch member from either end position. In addition to such spring, the first clutch may comprise a further spring which couples the one clutch member to the end portion of the respective crankshaft and also tends to move the one clutch member away from the other clutch member. Thus, the shifting means then overcomes the resistance of both springs in order to move the one clutch member into positive engagement with the other clutch member.

The novel features which are considered as characteristic of the invention are set forth in particular in the appended claims. The improved engine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a somewhat schematic partly elevational and partly sectional view of an internal combustion engine which embodies one form of the invention and wherein one of the two clutches is installed within and the other clutch is installed outside of the casing or cylinder block of the engine.

DESCRIPTION OF THE PREFERRED EMBODIMENTS

The single FIGURE of the drawing illustrates a portion of an internal combustion engine having several sections or units. The first unit comprises a first crankshaft 1 which can be rotated by several cylinders (not shown), and a second unit of the engine comprises a second crankshaft 4 which is coaxial with the first crankshaft 1 and can be rotated by several additional cylinders (not shown). That end portion of the first crankshaft 1 which is adjacent to the end portion 3 of the second crankshaft 4 is rigidly connected with a first clutch member 2. That end face of the clutch member 2 which faces toward the second crankshaft 4 has a toothed profile 6 consisting of alternating teeth and tooth spaces which can be positively engaged by the tooth spaces and teeth of a complementary profile 8 on the adjacent left-hand end face of a second clutch member 7 which is rotatable with and is movable axially of the second crankshaft 4. The configurations of the two profiles are preferably such that the clutch member 7 can be moved toward and to an end position of positive torque-receiving or torque-transmitting engagement with the clutch member 2 only when the two clutch members assume predetermined angular positions with reference to each other. This can be readily accomplished by selecting the configurations of the teeth and tooth spaces on the profiles 6 and 8 in such a way (as considered in circumferential as well as in axial direction of the crankshafts 1 and 4) that the profile 8 can positively engage the profile 6 only when the two crankshafts rotate at identical speeds and also when the crankshaft 4 assumes a predetermined angular position with reference to the crankshaft 1 so that each tooth of the profile 8 can enter a single complementary tooth space in the profile 6 and vice versa.

The clutch member 7 is axially movably connected with the end portion 3 of the second crankshaft 4 by a resilient element such as a diaphragm spring 9. As shown in the drawing, the diaphragm spring 9 is a ring-shaped spring the outer marginal portion of which is rigidly connected to the left-end face of the end portion 3 of the second crankshaft 4 and the inner marginal portion of which is rigidly connected to the right-hand end face of the clutch member 7. The connection between the outer marginal portion of the spring 9 and the crankshaft 4 may comprise an annulus of screws, bolts or analogous fasteners 9a. Similar connections (e.g., rivets 9b) can be provided between the inner marginal portion of the spring 9 and the clutch member 7.

The diaphragm-type spring 9 can be replaced by other types of suitable resilient means which enable the clutch member 7 to move axially of the crankshaft 4 but cannot rotate with respect to the end portion 3. For example, a suitable resilient connection between the clutch member 7 and the end portion 3 of the crankshaft 4 may comprise two concentric washers which are connected to each other by radially extending leaf springs. The inner washer is bolted or otherwise fastened to the clutch member 7 and the other washer is bolted or otherwise secured to the end portion 3 of the crankshaft 4, or vice versa.

The second clutch member 7 comprises an annular extension 12 which constitutes a cup and extends in a direction to the right, as viewed in the drawing, i.e., toward the crankshaft 4. The extension 12 and a cylindrical portion 7a of the clutch member 7 define a ring-shaped compartment 13 for a two-position spring or snap-over spring 15. The outer marginal portion of the two-position spring 15 extends into a groove 16 which is machined into the internal surface 14 of the extension 12, and the inner marginal portion of the spring 15 extends into a groove which is machined into or otherwise formed in the external surface of a projection 17. The groove 16 in the internal surface 14 ensures that the outer marginal portion of the spring 15 cannot move axially of the extension 12 of the clutch member 7. The projection 17 is a ring-shaped retainer which is riveted or otherwise secured to the end portion 3 of the second crankshaft 4. It will be noted that the outer marginal portion of the spring 15 can share the axial movements of the clutch member 7 relative to the end portion 3 of the crankshaft 4 but the inner marginal portion of the spring 15 does not participate in such axial movement. The retainer 17 may constitute a metallic annulus the outer marginal portion of which is riveted to the end portion 3 and the inner marginal portion of which has the aforementioned external circumferential groove for the inner marginal portion of the two-position spring 15.

The spring 15 serves to maintain the clutch member 7 in either of two predetermined end positions with reference to the end portion 3 of the second crankshaft 4. One such end position is shown in the drawing, and the clutch member 7 assumes the other end position after completing an axial movement in a direction away from the end portion 3 so that the outer marginal portion of the spring 15 is located to the left of the inner marginal portion. When the clutch member 7 assumes its left-hand end position, its profile 8 can positively engage the profile 6 of the first clutch member 2 which is non-rotatably secured to the respective end portion of the crankshaft 1 and cannot or need not move axially toward or away from the end portion 3 of the crankshaft 4. In the illustrated end position of the clutch member 7, the profile 6 on the clutch member 2 can rotate relative to the profile 8 of the clutch member 7.

The means for shifting the clutch member 7 between the aforementioned end positions comprises two electromagnets 18 and 19. The electromagnets 18 and 19 flank the extension 12 of the clutch member 7 and exert a force upon the clutch member 7 through the medium of such extension. The electromagnet 19 is located to the left of the extension 12 and attracts the latter when the profile 8 is to positively engage the profile 6. The electromagnet 18 is located to the right of the extension 12 and is energized to attract the extension 12 when the spring 15 is to reassume its illustrated position, i.e., when the clutch member 7 is to disengage its profile 8 from the profile 6 of the first clutch member 2. All that the electromagnet 19 has to do in order to positively engage the profiles 8 and 6 with each other is to move the extension 12 in a direction to the left, as viewed in the drawing, until the spring 15 reaches and moves beyond its dead-center position so that the spring 15 can push the clutch member 7 the rest of the way to the left-hand end position. The same holds true for the action of the electromagnet 18 upon the extension 12 in order to return the clutch member 7 to the illustrated right-hand end position. Of course, the electromagnet 19 must further overcome the resistance of the spring 9 which urges the clutch member 7 to the illustrated right-hand end position.

It is also possible to operate with a single electromagnet, for example, with the electromagnet 19. When the electromagnet 19 is energized, it pulls the clutch member 7 toward the clutch member 2 and effects an engagement of the profiles 6 and 8 provided, of course, that the angular velocity of the crankshaft 4 equals or closely approximates the angular velocity of the crankshaft 1 and that the angular position of the crankshaft 4 with reference to the crankshaft 1 is such that the teeth of the profile 8 can penetrate into the tooth spaces of the profile 6 and vice versa. The electromagnet 19 then remains energized as long as the clutch including the clutch member 2 and 7 is to maintain the crankshafts 1 and 4 in positive engagement with each other. In such modified apparatus, the spring 15 is designed to permanently urge the clutch member 7 to the illustrated right-hand end position in which the profile 8 is disengaged from the profile 6. Alternatively, and again assuming that the electromagnet 18 is omitted, the two-position spring 15 can be retained but the apparatus then comprises an additional spring which stores energy in response to movement of the clutch member 7 toward the clutch member 2. The energy remains stored as long as the electromagnet 19 is energized. The additional spring is free to dissipate energy in response to deenergization of the electromagnet 19 and to cause the spring 15 to move toward and beyond its dead-center position so that the spring 15 thereupon automatically returns the clutch member 7 to the end position which is shown in the drawing. The spring 9 may constitute the just discussed additional spring.

The first crankshaft 1 rotates a first camshaft 20 which is parallel thereto and is rotatably mounted in a second camshaft 21 which is a hollow cylindrical body parallel to the crankshafts 1 and 4. The camshaft 20 is driven by a torque-transmitting gear train 29, 29a so that it rotates at half the speed of the associated camshaft 1. The camshaft 21 can drive the crankshaft 4 through the median of a second torque-transmitting gear train including gears 30 and 30a which rotate the crankshaft 4 at twice the speed of the camshaft 1 provided, of course, that the camshaft 21 serves to transmit torque to the crankshaft 4. The first camshaft 20 rotates whenever the first crankshaft 1 is rotated by the corresponding group of cylinders (not shown) in the internal combustion engine. The second camshaft 21 also shares all angular movements of the crankshaft 4, and vice versa, but it does not rotate in automatic response to rotation of the crankshaft 1.

In accordance with a feature of the invention, the structure which is shown in the drawing further comprises an accelerating clutch 22 which is preferably a dry friction clutch and is installed outside of the casing 5. The clutch 22 can be engaged by a device 33 to transmit torque from the first camshaft 20 to the second camshaft 21 which, in turn, rotates the crankshaft 4 preparatory to direct coupling of the crankshaft 4 with the crankshaft 1 through the mediun of the positive-engagement clutch including the clutch members 2 and 7. The clutch 22 is installed at that end of the casing 5 which is remotest from the first crankshaft 1.

A first clutch element 23 of the accelerating clutch 22 is non-rotatably secured to the extension or portion 20a of the first camshaft 20, namely to that part of the extension 20a which projects to the right and beyond the hollow camshaft 21, as viewed in the drawing. A second clutch element 24 of the clutch 22 is non-rotatably secured to the second camshaft 21. The engaging device 33 can move the first clutch element 23 axially of the camshafts 20 and 21 into and from frictional engagement with the clutch element 24, i.e., the device 33 can also serve as a means for disengaging the clutch element 23 from the clutch element 24. The extent of movement of the clutch element 23 toward the clutch element 24 determines the extent of frictional engagement between the clutch elements 23 and 24, i.e., the extent to which the driving camshaft 20 can rotate or slip relative to the driven camshaft 21. The arrangement is preferably such that the clutch element 23 is movable between two end positions in one of which it is completely disengaged from the clutch element 24 and in the other which the two clutch elements rotate as a unit without any slippage therebetween. The engaging and disengaging device 33 for moving the clutch element 23 axially receives signals from an operating means here shown as a control unit 27 which is preferably an electric or electronic circuit receiving signals from two discrete monitoring devices 25, 31 and 26, 32. The monitoring device 25, 31 serves to continuously monitor the angular velocity as well as the angular position of the first camshaft 20. To this end, the gear 29 of the gear train 29, 29a between the camshaft 20 and the associated crankshaft 1 comprises a portion (e.g. a magnet 31) which orbits along a predetermined path extending along a transducer 24 of the monitoring device so that the device 25, 31 transmits to the corresponding input a of the control unit 27 a series of signals or impulses the frequency of which is indicative of the angular velocity of the camshaft 20.

The input b of the control unit 27 is connected with the output of the transducer 26 in the other monitoring device 26, 32. The transducer 26 is adjacent to the path of orbital movement of a portion 32 (e.g., a permanent magnet) of the gear 30 which forms part of the aforementioned torque-transmitting connection 30, 30a between the camshaft 21 and the associated crankshaft 4. The frequency of signals or impulses which the transducer 26 transmits to the input b of the control unit 27 is indicative of the angular velocity of the camshaft 21, i.e., of the angular velocity of the crankshaft 4. As mentioned before, the angular velocity of the crankshaft 4 is proportional to the angular velocity of the camshaft 21. The same holds true for the first camshaft 20 and the associated crankshaft 1. The gear 29 can carry several magnets 31, and the gear 30 can carry several magnets 32. This merely increases the frequency of signal generation. Each of the transducers 25, 26 is a conventional component, for example, an inductive transducer of any commercially available design. The evaluating circuit of the control unit 27 compares the signals which are transmitted by the transducers 25, 26 and generates signals which are indicative of the difference (if any) between the angular velocities of the camshafts 20 and 21. In the absence of any difference, the signal at the output c of the control unit 27 causes energization of the shifting electromagnet 19 whereby the latter effects a positive engagement between the clutch members 2 and 7. The output c of the control unit 27 transmits such signal only when the angular position of the camshaft 21 relative to the camshaft 20 is such that the crankshaft 4 is in an optimum position for positive coupling to the crankshaft 1. The angular position of the camshaft 21 relative to the camshaft 20 can be readily ascertained by monitoring the length of the intervals between the generation of a signal which is transmitted to the input a and the generation of the next-following signal which is transmitted to the input b of the control unit 27. As mentioned before, the transmission of a signal from the output c of the control unit 27 entails the energization of electromagnet 19 which overcomes the resistance of the springs 9 and 15 and causes the clutch member 7 to assume its left-hand end position in which the profile 8 positively engages the profile 6 so that the crankshafts 1 and 4 are positively connected to each other and rotate in unison. At the same time, the output d of the control unit 27 transmits a signal to the device 33 so that the latter moves the clutch element 23 away from the clutch element 24, i.e., the accelerating clutch 22 is disengaged as soon as the clutch member 7 is caused to move into positive torque-transmitting or torque-receiving engagement with the clutch member 2.

The camshaft 20 can further serve to transmit torque to auxiliary apparatus in the vehicle which embodies the illustrated engine, for example, to a cooling fan, to a water circulating pump or the like. In the illustrated embodiment, the auxiliary apparatus can be driven by a rotary member in the form of a pulley 34 which indirectly receives torque from the camshaft 20 by way of the clutch element 23. The camshaft 20 further drives an oil pump 75 through the medium of a gear train 76. It is preferred to connect the auxiliary apparatus with the camshaft 20 because the latter is driven whenever the engine is on, i.e., whenever at least one group of the cylinders rotates the respective crankshaft (1).

The operation of the structure which is shown in the drawing is as follows:

It is assumed that the engine is operated in the partial-load range. Consequently, a first group of cylinders rotates the crankshaft 1 which rotates the camshaft 20 through the medium of the gear train 29, 29a. The positive-engagement clutch including the clutch members 2 and 7 is disengaged and the accelerating clutch 22 is also disengaged. This means that the crankshaft 4 is idle and the camshaft 20 rotates relative to the camshaft 21. The second clutch member 7 is held in the illustrated right-hand end position as a result of previous temporary energization of the electromagnet 18 which has overcome the resistance of the spring 15 and has caused this spring to move to and beyond its dead-center position so that the clutch member 7 has been shifted axially toward the end portion 3 of the second crankshaft 4.

If the operator of the vehicle desires to operate the engine at a maximum load, it is necessary to accelerate the second crankshaft 4 to the speed of the first crankshaft 1 before the positive-engagement clutch 2, 7 is engaged to establish a positive torque-transmitting connection between the two crankshafts. The operator can close an electric switch 33a (connected to an energy source 33b) which activates the device 33 in such a way that the accelerating clutch 22 begins to transmit torque from the first camshaft 20 to the second camshaft 21 which, in turn, rotates the second crankshaft 4. If desired, the switch 33a can be replaced by a lever or a pedal (not shown) which must be pivoted, depressed or otherwise displaced in order to move the clutch element 23 into engagement with the clutch element 24. The transducers 25 and 26 generate signals which denote the angular velocities of the camshafts 20 and 21. When the signals indicate that the angular velocity of the second camshaft 21 matches or closely approximates the angular veloctiy of the camshaft 20, the output c of the control unit 27 transmits a signal to energize the electromagnet 19 whereby the clutch member 7 is moved into positive engagement with the clutch member 2 and the crankshaft 1 drives the crankshaft 4. At the same time, the output d of the control unit 27 transmits a signal to the device 33 which disengages the clutch element 23 from the clutch element 24.

Energization of the electromagnet 19 is or can be of short duration in view of the aforediscussed nature of the two-position spring 15.

The device 33 may constitutes a hydraulically or pneumatically operated motor which can gradually shift the clutch element 23 into engagement with the clutch element 24. Reference may be had to the aforementioned commonly owned copending applications which describe suitable hydraulic engaging-disengaging devices capable of shifting a first clutch element of a friction clutch into or from engagement with a second clutch element of the same friction clutch. It is also possible to utilize a mechanically operated device, such as a lever or pedal, which is actuated or depressed by the operator of the vehicle. The transducers 25 and 26 cooperate with the associated portions 31 and 32 of the respective monitoring devices to ascertain the angular velocities and the relative angular positions of the crankshafts 20 and 21 irrespective of whether the device 33 is a hydraulically, mechanically, pneumatically or otherwise operated motor.

An advantage of the improved engine is that the camshafts 20 and 21 can accelerate the second camshaft 4 in a controlled manner to or close to the angular velocity of the crankshaft 1. The ratio of angular velocities of the camshafts 20, 21 is the criterion which determines the timing of energization of electromagnet 19, i.e., the timing of shifting of the axially movable clutch member 7 into positive engagement with the clutch member 2.

Another important advantage of the improved engine is that it allows for the firing of cylinders in a four-cylinder engine in an optimum sequence, it being assumed that each of the aforediscussed sections or units of the engine embodies two cylinders. In such engines, each camshaft completes one revolution for each firing of the cylinders in contrast to the crankshafts which complete two revolutions during the same interval of time. This means that the proper angular position of the crankshaft 4 with reference to the crankshaft 1 must be selected within an angle of 720 degrees rather than 360 degrees. It has been found that proper selection of the angular position of the crankshaft 4 relative to the crankshaft 1 is simplified considerably by utilizing monitoring means for the camshafts 20 and 21 rather than for the angular positions of the crankshafts 1 and 4. The illustrated arrangement eliminates the need for costly, complex and bulky additional equipment which would be necessary if the monitoring means were to determine the angular position of the crankshaft 4 relative to the crankshaft 1.

An additional important advantage of the improved engine is that one can achieve substantial savings in fuel and substantial reductions in the emission of deleterious combustion products into the surrounding atmosphere. The crankshaft 4 can be coupled to or disconnected from the crankshaft 1 at the will of the operator of the vehicle, and the wear on the parts during coupling or disconnection is negligible because the improved system ensures positive engagement between the clutch members 2 and 7 only when the difference between the angular velocities of the two crankshafts is zero or sufficiently close to zero as well as when the crankshaft 4 assumes a predetermined angular position with reference to the crankshaft 1. Such requirements are met during each and every one of successive engagements of the clutch including the clutch members 2 and 7.

The utilization of spring 9 or an analogous spring as a means for connecting the clutch member 7 with the end portion 3 of the crankshaft 4 ensures that the clutch member 7 is held against any uncontrolled angular movement relative to the crankshaft 4 but is free to perform the necessary axial movements in order to move its profile 8 into satisfactory engagement with the profile 6 of the clutch member 2 or to retract its profile 8 so that the clutch member 2 can rotate independently of the clutch member 7 and crankshaft 4.

The provision of two-position spring 15 in combination with the electromagnets 18 and 19 ensures that the electromagnet 18 or 19 must be energized for a very short interval of time in order to effect axial movement of the clutch member 7 to the respective end position. This is due to the fact that the spring 15 can bias the clutch member 7 to either of the two end positions and also that the spring 15 yieldably opposes movement of the clutch member 7 from the left-hand or from the right-hand end position, as viewed in the drawing. Short-lasting energization of the electromagnets 18 and 19 is desirable and advantageous for many reasons, particularly as regards the savings in electrical energy.

The placing of the accelerating clutch 22 at the outer side of that portion of the casing 5 which is remotest from the continuously driven crankshaft 1 is desirable and advantageous because there is ample room to afford access to the clutch 22 as well as to the rotary member 34 and to the belt or belts which receive motion from the member 34.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In an internal combustion engine, the combination of a first section having a first crankshaft, a first camshaft and means for transmitting torque between said first crankshaft and said first camshaft; a second section having a second crankshaft, a second camshaft and means for transmitting torque between said second crankshaft and said second camshaft, said first and second crankshafts having adjacent end portions; a first clutch including first and second clutch members respectively non-rotatably connected with the end portions of said first and second crankshafts, at least one of said clutch members being movable axially of said crankshafts to and from an end position and said clutch members having complementary profiles which engage each other to establish a direct torque-transmitting connection between said crankshafts in said end position of said one clutch member; shifting means operable to move said one clutch member to said end position; an accelerating clutch including coaxial first and second clutch elements respectively non-rotatably secured to said first and second camshafts; means for effecting engagement between said clutch elements to thereby accelerate said second crankshaft through the medium of said second camshaft; and means for operating said shifting means to move said one clutch member to said end position on completion of acceleration of said second camshaft to a speed which at least approximates the speed of said first camshaft.

2. The combination of claim 1, further comprising means for moving said one clutch member to a second end position in which said clutch members are free to rotate relative to each other.

3. The combination of claim 1, wherein said operating means includes means for operating said shifting means only in a predetermined angular position of said second crankshaft relative to said first crankshaft.

4. The combination of claim 1, further comprising means for yieldably biasing said one clutch member to a second end position in which said clutch members can rotate relative to each other.

5. The combination of claim 4, wherein said biasing means comprises a spring which couples said one clutch member to the respective crankshaft against angular movement but with freedom of axial movement of said one clutch member, said spring having a first portion non-rotatably connected to said one clutch member and a second portion non-rotatably connected to the respective crankshaft.

6. The combination of claim 5, wherein said spring is an annular spring having an inner marginal portion connected with said one clutch member and an outer marginal portion connected with the respective crankshaft.

7. The combination of claim 6, wherein said one clutch member is said second clutch member, said end portion of said second crankshaft having an end face facing said first crankshaft and said second clutch member having an end face facing the end face of the end portion of said second crankshaft, said inner marginal portion of said annular spring being connected with the end face of said second clutch member and said outer marginal portion of said annular spring being connected to the end face of the end portion of said second crankshaft.

8. The combination of claim 5, wherein said spring is a two-position spring arranged to bias ssid one clutch member to either of said end positions and to oppose the movement of said one clutch member from either of said end positions.

9. The combination of claim 8, wherein said one clutch member has a ring-shaped extension surrounding said spring.

10. The combination of claim 9, wherein said extension extends in a direction away from the other clutch member and has an internal surface which is engaged by said spring, the crankshaft which is connected with said one clutch member having a retainer for said spring.

11. The combination of claim 10, wherein said spring is an annular spring having inner and outer marginal portions, said internal surface having a first groove for the outer marginal portion of said spring and said retainer having a second groove for the inner marginal portion of said spring so that the inner marginal portion of said spring is held against axial movement and said outer marginal portion shares at least some axial movements of said one clutch member between said end positions thereof.

12. The combination of claim 1, wherein said shifting means comprises an electromagnet which is energizable to move said one clutch member to said end position and further comprising second shifting means operable to move said one clutch member to a second end position in which said clutch members are free to rotate relative to each other.

13. The combination of claim 12, wherein said second shifting means comprises a second electromagnet which is energizable to move said one clutch member to said second end position.

14. The combination of claim 13, wherein said electromagnets are energizable independently of each other.

15. The combination of claim 1, further comprising first and second monitoring means for respectively monitoring the angular velocities of said first and second camshafts and for generating first and second series of signals whose frequencies are indicative of angular velocities of the corresponding camshafts.

16. The combination of claim 15, wherein said operating means comprises means for evaluating said signals and for operating said shifting means when said signals denote that the angular velocity of said second camshaft at least approximates the angular velocity of said first camshaft.

17. The combination of claim 16, wherein said evaluating means includes means for operating said shifting means only when said second camshaft assumes a predetermined angular position with reference to said first camshaft.

18. The combination of claim 17, wherein said monitoring means include means for generating electric signals and said evaluating means comprises an electric circuit having an output connected with said shifting means, said shifting means including electromagnet means which is energized in response to signals from said output to thereby effect the movement of said one clutch member to said end position.

19. The combination of claim 15, wherein each of said monitoring means includes a portion rotatable with the respective camshaft and a transducer adjacent to the path of movement of the respective portion and operative to generate a signal in response to movement of the respective portion therealong.

20. The combination of claim 19, wherein said transducers include inductances.

21. The combination of claim 15, wherein said monitoring means include means for generating electric signals and said operating means comprises a control unit having an electric evaluating circuit receiving said signals and having signal transmitting output means connected with said shifting means, said circuit being arranged to compare the angular velocities of said camshafts in response to comparison of the frequencies of the respective series of signals and to ascertain the angular positions of said camshafts relative to each other in response to ascertainment of the length of intervals between the generation of a signal of the first series and the generation of the next following signal of the second series, said shifting means being responsive to signals at the output means of said evaluating circuit.

22. The combination of claim 1, further comprising a casing for said shafts, said accelerating clutch constituting a dry friction clutch which is installed outside of said casing.

23. The combination of claim 22, wherein one of said camshafts is hollow and the other of said camshafts has a portion extending through and beyond said hollow camshaft, one of said clutch elements being mounted on and being rotatable with said portion of said other camshaft.

24. The combination of claim 1, further comprising a rotary member receiving torque from said first camshaft.

25. The combination of claim 24, wherein said rotary member is non-rotatably connected with said first clutch element.

26. The combination of claim 25, wherein said rotary member is a pulley.

27. The combination of claim 1, further comprising means for disengaging said accelerating clutch on movement of said one clutch member to said end position.

28. The combination of claim 27, wherein said disengaging means includes a hydraulic disengaging device and forms part of said engaging means.

29. The combination of claim 27, further comprising signal generating means for monitoring the angular velocities of said camshafts and said operating means includes means for evaluating the signals from said monitoring means, said evaluating means including means for operating said shifting means to engage said one clutch member with said other clutch member and for simultaneously operating said disengaging means to disengage said clutch elements when the monitored angular velocity of said second camshaft at least approximates the angular velocity of said first camshaft.

* * * * *